(12) United States Patent
Chiyoda et al.

(10) Patent No.: US 7,564,155 B2
(45) Date of Patent: Jul. 21, 2009

(54) BEARING UNIT AND MOTOR (75) Inventors: Makoto Chiyoda, Kanagawa (JP); Yuji Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/832,247

(22) Filed: Aug. 1, 2007

(65) Prior Publication Data
US 2008/0036319 A1 Feb. 14, 2008

(30) Foreign Application Priority Data
Aug. 9, 2006 (JP) .............................. 2006-216337

(51) Int. Cl.
*H02K 7/08* (2006.01)
(52) U.S. Cl. ...................................... 310/90
(58) Field of Classification Search .............. 310/90, 310/90.5
See application file for complete search history.

(56) References Cited

U.S. PATENT DOCUMENTS 6,948,852 B2 * 9/2005 Oelsch .................. 384/100

FOREIGN PATENT DOCUMENTS

| JP | 2002-098146 | | 4/2002 |
|----|-------------|---|--------|
| JP | 2003-130066 | | 5/2003 |
| JP | 2004-036892 | | 2/2004 |
| JP | 2005-127514 | | 5/2005 |
| JP | 2005-315408 | | 11/2005 |
| JP | 2006-64171 | * | 3/2006 |

OTHER PUBLICATIONS

Japanese Office Action issued on Aug. 12, 2008.

* cited by examiner

*Primary Examiner*—Hanh N Nguyen
(74) *Attorney, Agent, or Firm*—Sonnenschein Nath & Rosenthal LLP (57) ABSTRACT

Herein disclosed a bearing unit including: a dynamic pressure fluid bearing adapted to receive a rotary shaft inserted thereinto; a unit main body surrounding the outside of the fluid bearing; a lid member covering an upper opening of the unit main body with the rotary shaft inserted into the dynamic fluid bearing; lubricating oil poured into the unit main body; and an oil thrower ring rotating together with the rotary shaft in a space defined between an upper end of the fluid bearing and the lid member; wherein a gap defined between the lid member and the oil thrower ring is tapered in cross-section so as to be progressively reduced in the distance therebetween as the gap is spaced apart from the center of the rotary shaft.

3 Claims, 6 Drawing Sheets

PRIOR ART

FIG. 9

PRIOR ART

FIG.10

PRIOR ART

BEARING UNIT AND MOTOR

CROSS REFERENCES TO RELATED APPLICATIONS

The present invention contains subject matter related Japanese Patent Application JP 2006-216337 filed in the Japan Patent Office on Aug. 9, 2006, the entire contents of which being incorporated herein by reference.

BACKGROUND OF THE INVENTION

1. Field of the Invention

The present invention relates to a bearing unit in which a dynamic fluid bearing adapted to receive a rotary shaft inserted thereinto is covered by a unit main body and to a motor using the bearing unit.

2. Description of the Related Art

Figure 8:
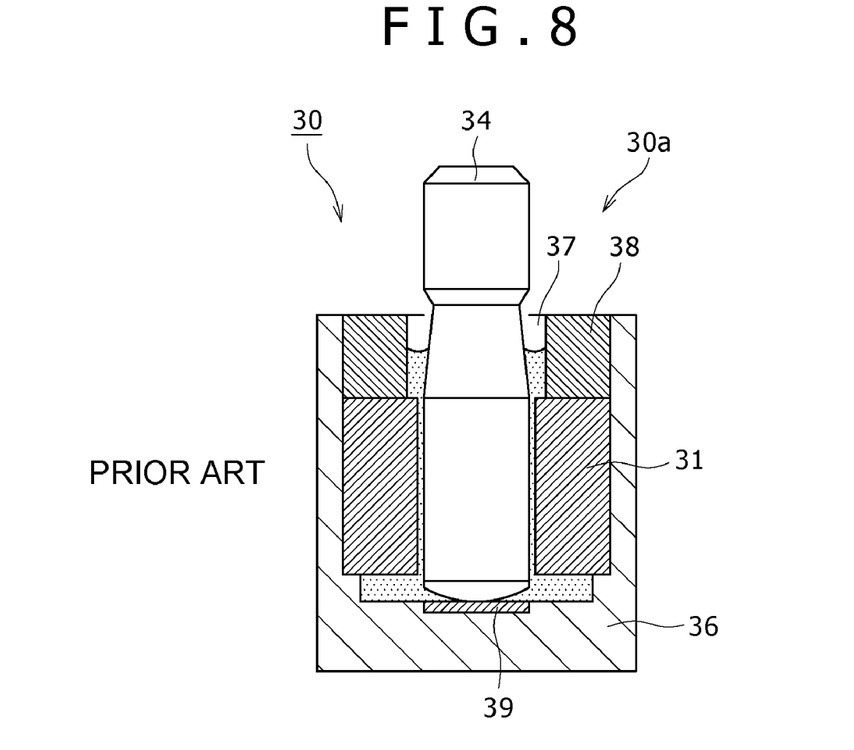
FIG. 8 is a schematic cross-sectional view for assistance in explaining a bearing unit equipped with a non-contact rotational seal in related art.

FIG. 8 is a schematic cross-sectional view for assistance in explaining a bearing unit provided with a non-contact rotational seal (hereinafter, simply referred to as "the seal") in related art. A bearing unit 30 is configured as below. A shaft 34 is rotatably supported by a slide bearing 31 and a thrust bearing 39 (a pivot bearing in this case). A non-contact rotational seal 30a is composed of a gap portion 37 defined between the shaft 34 and a gap-forming member 38 and tapered in cross-section axially-inwardly from the slide bearing 31 for preventing leakage of lubricating oil. A stator member 36 holds the slide bearing 31, the thrust bearing 39 and the gap-forming member 38.

Then, a description is made of how the gap portion 37 tapered axially-inwardly from the slide bearing 31 provides a non-contact rotational seal for retaining lubricating oil inside the bearing unit.

Fluid tends to move in a narrower width due to the capillary phenomenon. If it is intended to retain lubricating oil inside the bearing unit, then the bearing unit is preferably provided with a gap that is tapered in cross-section toward the inside thereof. The lubricating oil in the gap thus tapered will move toward the inside of the bearing unit for retainment.

In this case, the drawing pressure P generated by the capillary phenomenon is represented by the equation, $P=2\gamma \cos \theta/r$, where $\gamma$ is surface tension occurring between lubricating oil and a lubricating oil-contact object (if this object is the shaft 34, it is made of stainless steel or duralumin; if the object is the gap-forming member 38, it is made of metal or resin), $\theta$ is a contact angle between the lubricating oil and the lubricating oil-contact object and r is a width of the gap portion 37.

That is to say, $P \propto 1/r$; therefore, the lubricating oil is drawn toward the inside of the bearing unit having a smaller gap width r for retainment.

In this way, the non-contact rotational seal 30a in the related art can seal the lubricating oil of the rotational portion in a non-contact manner by devising the shape of the seal portion and using the surface tension of the lubricating oil. Because of the non-contact seal, the non-contact rotational seal 30a is of an excellent lubricating oil sealing system that has no torque loss and maintains excellent rotational-mechanical accuracy such as no axial vibration.

Figure 9:
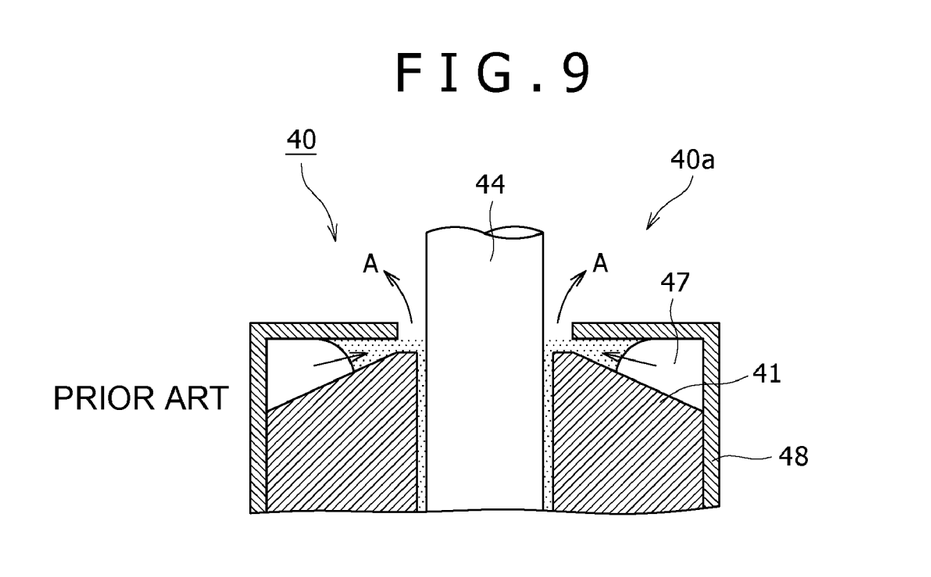
FIG. 9 is an enlarged schematic cross-sectional view of a seal portion extracted from the bearing unit described in Patent Document 1.

FIG. 9 is a cross-sectional view of a seal portion extracted from the bearing unit 40 illustrated in Japanese Patent Laid-open No. 2005-127514 (hereinafter referred as Patent Document 1). The seal portion of the bearing unit 40 intends to solve the difficulty of thinning which is a defect of the bearing unit 30 shown in FIG. 8. That is to say, a gap portion 47 defined by the end face of a slide bearing 41 and a gap-forming member 48 is tapered in cross-section toward the shaft 44.

Figure 10:
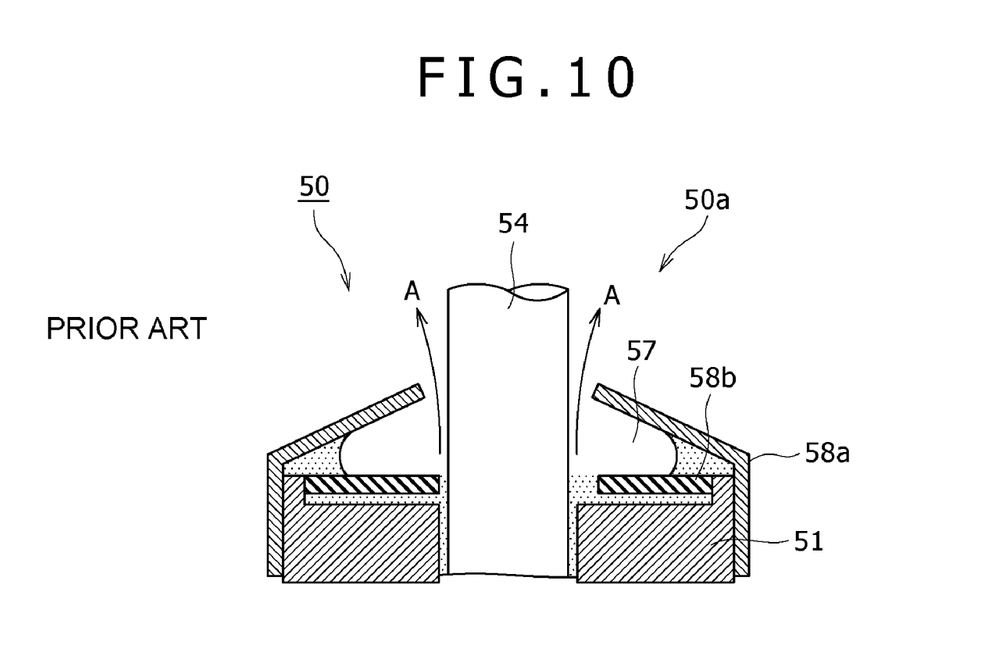
FIG. 10 is an enlarged schematic cross-sectional view of a seal portion extracted from the bearing unit described in Patent Document 2.

FIG. 10 is a cross-sectional view of a seal portion extracted from the bearing unit 50 illustrated in Japanese Patent Laid-open No. 2004-36892 (hereinafter referred as Patent Document 2). The seal portion of the bearing unit 50 is provided on the end face portion of a slide bearing 51 with a gap portion 57 which is defined by a plate-like member 58b and a gap-forming member 58a so as to be tapered in cross-section toward the outside.

SUMMARY OF THE INVENTION

Like the bearing unit 30 shown in FIG. 8, the non-contact seal 30a which needs to form the gap portion 37 extending toward the shaft requires some degree of thickness because of taper formation and of preparation for a rise in the level of the lubricating oil resulting from thermal expansion. Thus, the non-contact seal 30a has a defect in which it is difficult to reduce the thickness of the bearing unit 30.

The gap portion 47 of the bearing unit 40 shown in FIG. 9 is not located on the route, indicated with arrow A, through which the lubricating oil leaks from between the shaft 44 and the inner circumferential surface of the slide bearing 41 or the radial bearing device to the outside of the bearing unit 40. Thus, although the bearing unit 40 plays a role of positively feeding the lubricating oil to the sliding surface between the shaft 44 and the slide bearing 41, it has a problem in which it is impossible to produce an excellent effect of preventing the lubricating oil from leaking to the outside and from splashing.

Similarly, the bearing unit 50 shown in FIG. 10 is not located on the route, indicated with arrow A, through which the lubricating oil leaks. Thus, the bearing unit 50 has a defect in which it cannot produce an excellent effect of preventing the lubricating oil from leaking and splashing resulting from the rotation of the shaft 54.

In other words, the bearing unit 50 is not distinctive in playing the role of positively drawing the lubricating oil into the inside but prevents the mist of the lubricating oil splashing resulting from the rotation of the shaft 54 from diffusing outward for reuse.

As described above, the non-contact seals in the related art cannot overcome the defects in which since it is necessary to provide a tapered gap in the axial direction, thinning is difficult, and while it is intended to provide thinning, since the seal is not located on the outflow path of the lubricating oil, it is difficult to prevent the leakage of the lubricating oil.

According to an embodiment of the present invention, there is provided a bearing unit including: a dynamic pressure fluid bearing adapted to receive a rotary shaft inserted thereinto; a unit main body surrounding the outside of the fluid bearing; a lid member covering an upper opening of the unit main body with the rotary shaft inserted into the fluid bearing; lubricating oil poured into the unit main body; and an oil thrower ring rotating together with the rotary shaft in a space defined between an upper end of the fluid bearing and the lid member; wherein a gap defined between the lid member and the oil thrower ring is tapered in cross-section so as to be progressively reduced in the distance therebetween as the gap is spaced apart from the center of the rotary shaft.

According to another embodiment of the present invention, there is provided a motor using the bearing unit described above.

In the embodiment of the present invention described above, the oil thrower ring rotating together with the rotary shaft is provided between the upper portion of the dynamic pressure fluid bearing and the lid member and the gap defined between the oil thrower ring and the lid member is tapered in cross-section so as to be reduced in the distance therebetween as it is spaced apart from the center of the rotary shaft. Thus, the path of the lubricating oil is partitioned by the oil thrower ring to extend along a direction perpendicular to the rotary shaft in a reciprocative manner. In addition, the lubricating oil can be led toward the inside of the bearing unit by the gap tapered between the oil thrower ring and the lid member.

In particular, according to the invention, since the oil thrower ring is rotated together with the rotary shaft, the lubricating oil can forcibly be led toward the inside of the bearing unit by the centrifugal force resulting from the rotation of the oil thrower ring.

Accordingly, the present invention can produce the following effects. The gap which is tapered in cross-section so as to be progressively reduced in the distance thereof as it is spaced apart from the center of the shaft can extend the path of the lubricating oil in the direction perpendicular to the shaft. Thus, the entire bearing unit can be reduced in thickness. In addition, the direction of the surface tension of the tapered portion conforms to the direction of the centrifugal force resulting from the rotation of the oil thrower ring. The path of the lubricating oil is elongate and has a labyrinth structure. Thus, excellent lubricating oil retaining performance can be exhibited.

As described above, the bearing unit according to the embodiments of the invention is thin and can provide excellent lubricating oil retaining performance; therefore, the motor mounted with the bearing unit of the invention can suitably applied to electronic equipment such as personal computers and video equipment such as televisions which require thinness and a long life. In addition, the bearing unit of the invention is such that the oil thrower ring also serves as a locking member of the rotary shaft; therefore, the number of component parts can be reduced compared with that of the related art.

DETAILED DESCRIPTION OF THE PREFERRED EMBODIMENTS

Figure 1:
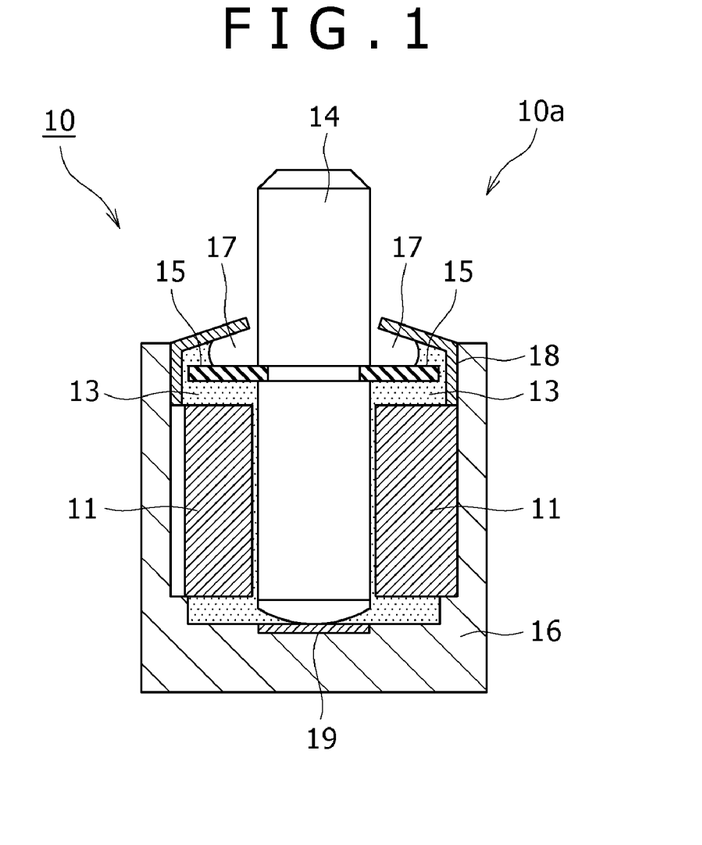
FIG. 1 is a schematic cross-sectional view for assistance in explaining a bearing unit according to a first embodiment.

Preferred embodiments of the present invention will hereinafter be described with reference to the drawings. FIG. 1 is a schematic cross-sectional view for assistance in explaining a bearing unit of a first embodiment. A bearing unit 10 according to the first embodiment is configured as below. A shaft 14 is rotatably supported by a slide bearing 11 and a thrust bearing 19 (a pivot bearing in this case). An oil thrower ring 15 is integrally attached to the shaft 14 so as to be rotatable therewith. A gap portion 17 is defined between the oil thrower ring 15 and a gap-forming member 18 which is a lid member so as to be tapered in cross-section radially toward the outside from the shaft 14. Thus, a non-contact rotational seal 10a is configured to prevent leakage of lubricating oil. A stator member 16 holds the slide bearing 11, the thrust bearing 19 and the gap-forming member 18.

The non-contact seal 10a of the bearing unit 10 according to the embodiment has a feature that the oil thrower ring 15 and the gap-forming member 18 form the gap portion tapered in cross-section in a direction of drawing lubricating oil into the inside of the bearing unit and the oil thrower ring 15 is rotated integrally with the shaft 14.

That is to say, the direction of drawing the lubricating oil into the tapered gap portion 17 conforms to the direction of a centrifugal force generated by the rotation of the oil thrower ring 15. Therefore, performance can be provided for more firmly retaining lubricating oil.

The slide bearing 11 is a dynamic pressure fluid bearing in which lubricating oil is interposed between the shaft 14 and the slide bearing 11 to radially support the bearing 11 for rotation with low friction. The lubricating oil is filled inside the stator member 11 and is prevented from leaking upward by the gap-forming member 18 covering the upper opening of the stator member 16.

Figure 2:
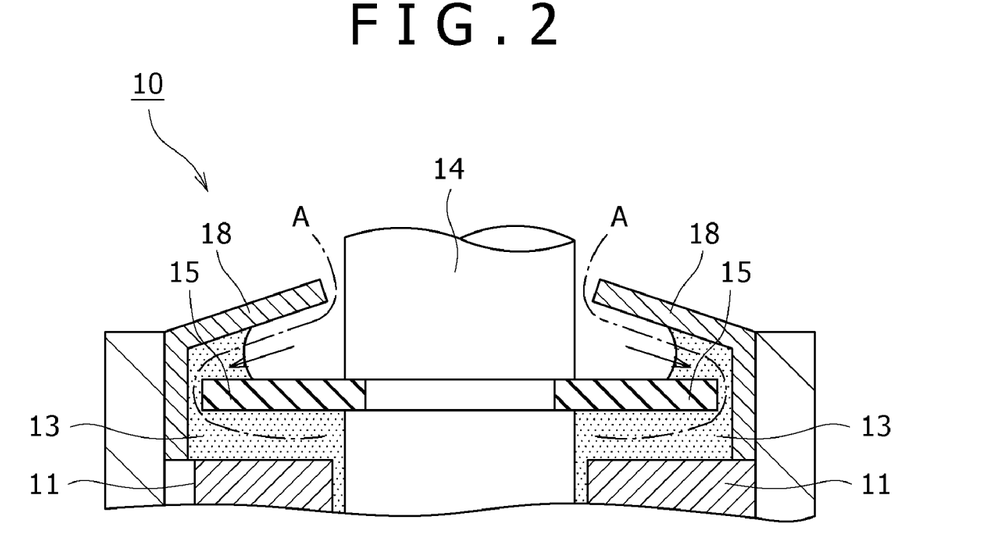
FIG. 2 is an enlarged cross-sectional view for assistance in explaining a major portion of the bearing unit according to the first embodiment.

FIG. 2 is an enlarged schematic cross-sectional view for assistance in explaining the major portion of the bearing unit according to the first embodiment. The oil thrower ring 15 attached to the shaft 14 is a ring member made of metal or resin and fixedly fitted to the groove of the shaft 14. Alternatively, the oil thrower ring 15 may firmly be secured to the shaft 14 with an adhesive or by welding or the like as necessary.

The oil thrower ring 15 is perpendicularly attached to the shaft 14 to partition the gap between the upper surface of the slide bearing 11 and the gap-forming member 18. This forms the gap portion 17 on the upper side of the oil thrower ring 15 and a gap portion 13 on the lower side thereof.

There is provided a small gap between the end of the oil thrower ring 15 and the gap-forming member 18. Specifically, a lubricating oil flow passage A is formed which extends between the upper portion of the slide bearing 11 and the gap between the gap-forming member 18 and the shaft 14 as indicated with a dashed line in FIG. 2. The lubricating oil can reciprocate perpendicularly to the shaft 14. In short, the lubricating oil flow passage A can be extended perpendicularly to the shaft 14, whereby the bearing unit 10 can be reduced in thickness while ensuring a sufficient length of the flow passage.

Further, the configuration of the present embodiment has the tapered gap portion 17 provided on the mid-course of the lubricating oil flow passage A and a long course from the sliding portion relative to the shaft 14 to the external portion of the bearing and provide a labyrinth structure, which can exhibit an effect of sufficiently retaining lubricating oil.

Needless to say, this configuration intends to prevent the lubricating oil from flowing out from the gap portion 13 between the slide bearing 11 and the oil thrower ring 15 via the tapered gap portion 17. Therefore, the other portions such as the fastening portion of the stator member 16 to the gap-forming member 18 and the fastening portion of the shaft 14 to the oil thrower ring 15 may be sealed by an adhesive, laser welding or a sealing member such as rubber.

The bearing unit 10 configured as described above can reliably prevent leakage of the lubricating oil by the tapered gap portion 17 drawing the lubricating oil from the center of the shaft 14 to the outside thereof and by the action of the centrifugal force resulting from the shaft 14 and the oil thrower ring 15.

Figure 3:
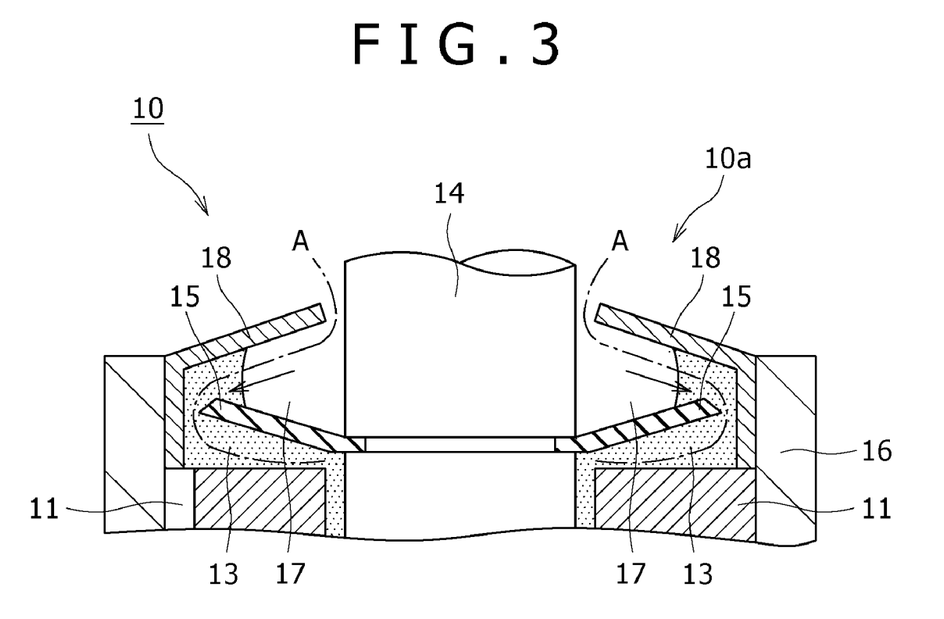
FIG. 3 is an enlarged cross-sectional view for assistance in explaining a major portion of a bearing unit according to a second embodiment.

FIG. 3 is an enlarged schematic cross-sectional view for assistance in explaining a major portion of a bearing unit according to a second embodiment. A non-contact seal 10a of this embodiment further enhances lubricating oil-retaining performance resulting from surface tension compared with the non-contact seal provided for the bearing unit 10 shown in FIGS. 1 and 2.

The non-contact seal 10a is distinctive in providing a continuously tapered gap formed as below. A gap portion 13 between the upper portion of a slide bearing 11 and an oil thrower ring 15 is tapered in cross-section toward a sliding surface, i.e., the center of the shaft 14. In addition, a gap portion 17 between the oil thrower ring 15 and a gap-forming member 18 is progressively reduced in the distance therebetween with increasing distance from the sliding surface, i.e., the center of the shaft 14.

In the embodiment shown in FIG. 3, to form the continuously tapered gap described above, the oil thrower ring 15 is formed to extend obliquely upward with respect to the shaft 14. The tapered gap 17 allows the lubricating oil to be drawn in a direction opposite to the shaft 14. In addition, the gap portion 13 is tapered in cross-section to allow the lubricating oil to be drawn toward the shaft 14. In other words, since also the gap portion 13 is tapered additionally to the tapered gap portion 17, a force of drawing the lubricating oil by use of the capillary phenomenon is increased to make it possible to positively prevent the leakage of the lubricating oil.

Figure 4:
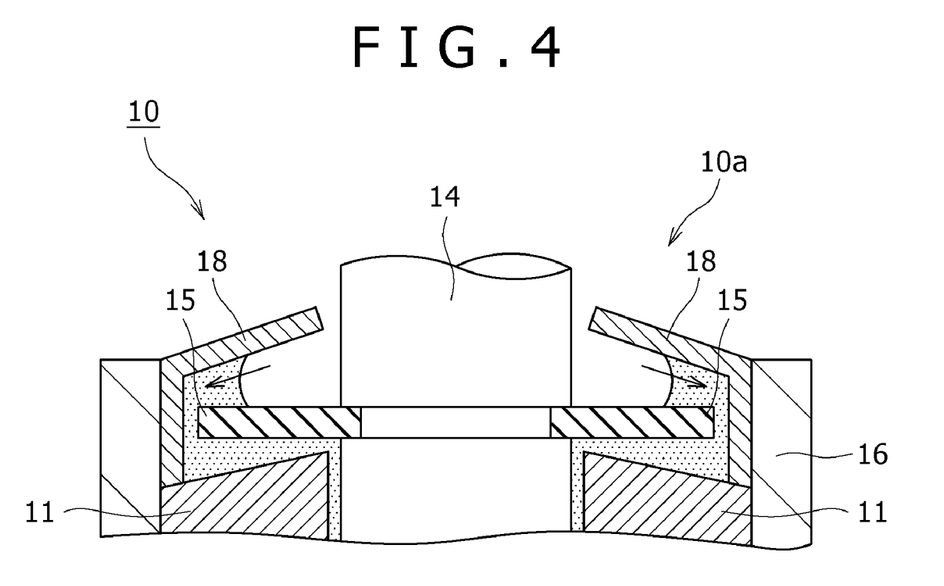
FIG. 4 is an enlarged cross-sectional view for assistance in explaining a major portion of a bearing unit according to a third embodiment.

FIG. 4 is an enlarged schematic cross-sectional view for assistance in explaining the major portion of a bearing unit according to a third embodiment. As with the second embodiment shown in FIG. 3, a non-contact seal 10a is continuously tapered in cross-section with an oil thrower ring 15 located between gap portions. However, the oil thrower ring 15 is formed to extend perpendicularly to the shaft 14 and the upper end of a slide bearing 11 is slantly formed to provide a lower gap portion with a lower tapered shape.

Similarly to the above embodiments, the bearing unit 10 of the third embodiment forms the continuously tapered gaps. Thus, the tapered shape is increased in length to enhance performance for drawing the lubricating oil.

Figure 5:
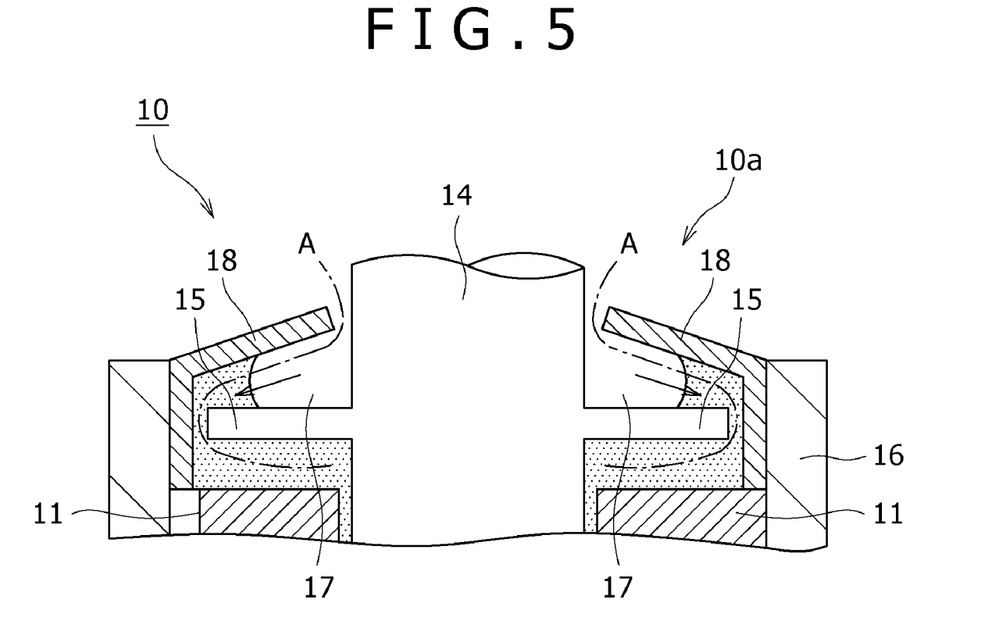
FIG. 5 is an enlarged cross-sectional view for assistance in explaining a major portion of a bearing unit according to a fourth embodiment.

FIG. 5 is an enlarged schematic cross-sectional view for assistance in explaining the major portion of a bearing unit according to a fourth embodiment. A non-contact seal 10a of a bearing unit 10 is such that an oil thrower ring 15 is formed integrally with a shaft 14. While in the embodiments described earlier the oil thrower ring 15 is separately attached to the shaft 14, in the present embodiment the oil thrower ring 15 is formed integrally with the shaft 14 when the shaft 14 is formed by cutting or the like.

The configuration of the present embodiment provides the same performance of drawing the lubricating oil as that of the embodiment shown in FIG. 2. The direction of drawing the lubricating oil into the tapered gap portion 17 conforms to the direction of a centrifugal force generated by the rotation of the oil thrower ring 15. Therefore, performance can be provided for more firmly retaining lubricating oil.

Since the oil thrower ring 15 formed integrally with the shaft 14 is provided, a process of separately attaching an oil thrower ring 15 to the shaft 14 can be omitted. In addition, the number of component parts can be reduced and reliability resulting from the integral formation can be increased.

In general, if at least a radial bearing device is a dynamic pressure bearing formed with herring bone-shaped or axially shaped dynamic pressure generating grooves, it is significantly important to retain lubricating oil indispensable to form an oil film. The non-contact seals 10a of the embodiments can provide an effect sufficient to cope with this. Needless to say, also the thrust bearing device may be a dynamic pressure bearing.

Figure 6:
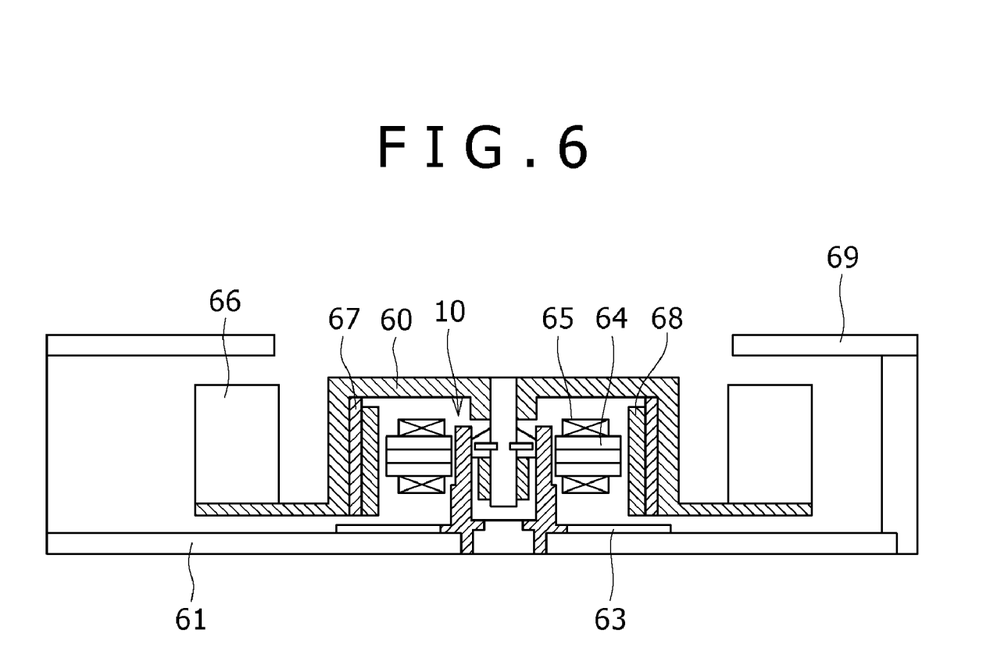
FIG. 6 is a schematic view of a fan motor provided with one of the bearing units of the embodiments.

FIG. 6 is a schematic diagram of a fan motor on which any one of the bearing units according to the embodiments is mounted. This fan motor includes a rotor 60, a base plate 61, a housing 62, a rotation drive circuit 63, a core 64, a winding 65, an impeller 66, a magnetic case 67, a magnet 68, a case 69, and a bearing unit 10.

The housing 62 is provided outside the bearing unit 10. The bearing unit 10 is secured to the base plate 61 via the housing 62. Coils composed of the cores 64 and windings 65 are attached to the housing 62. The coils are opposed to the magnets 68 of the rotor 60 rotatable with a shaft of the bearing unit 10. The rotor 60 is provided with a plurality of the impellers 66. The impellers 66 rotate together with the rotor 60 to generate air flow.

Any one of the bearing units according to the embodiments described above is used as the bearing unit 10 of such a fan motor to reduce the thickness of the entire fan motor. In addition, it is possible to effectively prevent lubricating oil from leaking from the bearing unit 10, thereby enhancing reliability of the fan motor.

A description is next made of a method of manufacturing the bearing unit according to the present embodiment. For the bearing units 10 according to the first, second, third and fourth embodiments shown in FIGS. 1, 3, 4 and 5, respectively, the stator member 16 is preliminarily molded with resin and the thrust bearing 19 and slide bearing 11 are assembled into the stator member 16. Thereafter, the oil thrower ring 15 is attached to the shaft 14. In the fourth embodiment shown in FIG. 5, the oil thrower ring 15 is formed integrally with the shaft 14; therefore, it is not necessary to attach the oil thrower 15 to the shaft 14. Next, the shaft 14 attached with the oil thrower ring 15 is inserted into the central hole of the slide bearing 11.

Thereafter, the gap-forming member 18 is pressably put on the upper portion of the slide bearing 11 assembled into the stator member 16. The lubricating oil is injected into the inside defined by the stator member 16 and the gap-forming member 18. Incidentally, the lubricating oil may be injected before the shaft is inserted after the slide bearing 11 has been assembled into stator portion 16.

Figure 7A:
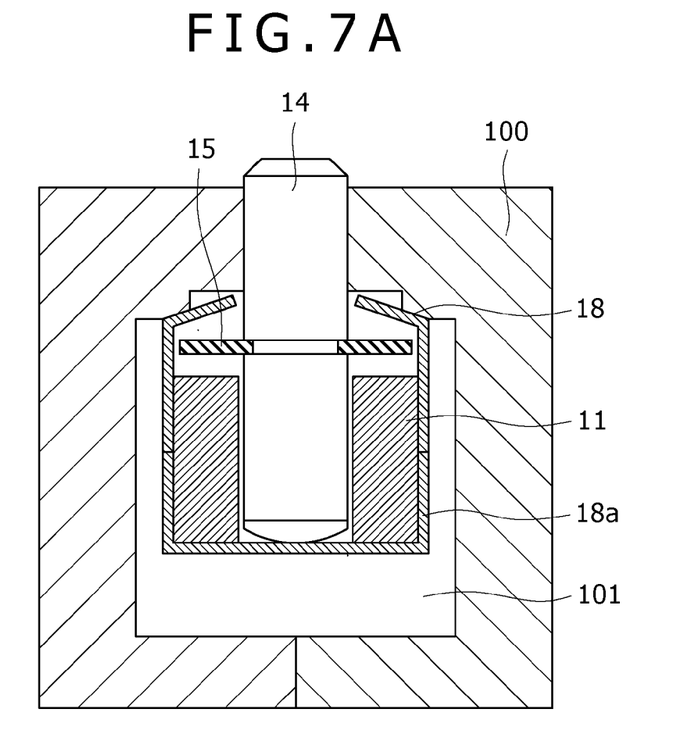
FIG. 7 is a schematic cross-sectional view for assistance in explaining a unit-forming method.
Figure 7B:
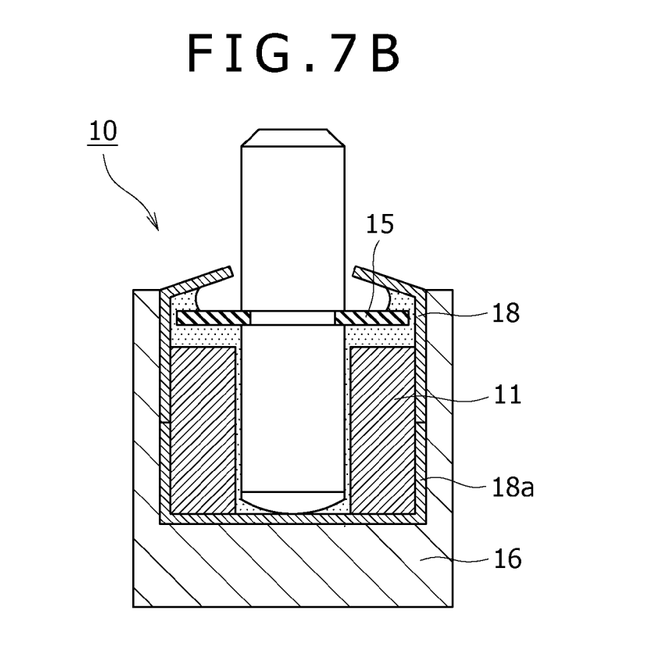

Unit molding may be conceivable in which the slide bearing 11, the shaft 14 and the oil thrower ring 15 are assembled along with molding of the stator member 16 in addition to the manufacturing method described above. FIGS. 7A and 7B are schematic cross-sectional views for assistance in explaining the unit molding method. Referring to FIG. 7A, the slide bearing 11 is first inserted into a lower support member 18a made of metal and the shaft 14 provided with the oil thrower ring 15 is inserted into the central hole of the slide bearing 11. The gap-forming member 18 made of the same metal as the lower support member 18*a* is joined to the lower support member 18*a* by welding or the like to constitute an inner structure.

Then, the inner structure configured as described above is disposed in a cavity 101 of left and right molds 100 and gripped by the molds 100. Specifically, the gap-forming member 18 and the lower support member 18*a* are disposed in the cavity 101 of the molds 100 while the shaft 14 extending from the gap-forming member 18 is gripped and held by the molds 100. In this state, melting resin is poured into the cavity 101 of the molds 100 and cured. Then, the left and right molds 100 are opened and the bearing unit 10 is taken out therefrom. In this way, the bearing unit 10 in which the internal structure is assembled into the stator member 16 can be unit-molded as shown in FIG. 7B.

Incidentally, while the bearing units 10 according to the embodiments are each applied to the fan motor as described above, the present invention is not limited to this. The present invention can be applied to motor equipment (e.g., various types of memory media drives) other than the fan motor.

It should be understood by those skilled in the art that various modifications, combinations, sub-combinations and alterations may occur depending on design requirements and other factors insofar as they are within the scope of the appended claims or the equivalents thereof.

What is claimed is:

1. A bearing unit comprising:
    a dynamic pressure fluid bearing having a tapered upper end, the dynamic pressure fluid bearing configured to receive a rotary shaft inserted into said dynamic pressure fluid bearing;
    a unit main body surrounding the outside of the fluid bearing;
    a lid member covering an upper opening of the unit main body with the rotary shaft inserted into the dynamic fluid bearing;
    lubricating oil within the unit main body; and
    an oil thrower ring extending perpendicular to the rotary shaft and rotatable together with the rotary shaft in a space defined between an upper end of the fluid bearing and the lid member;
    wherein,
    a gap defined between the lid member and the oil thrower ring is tapered in cross-section so as to progressively reduce in the distance therebetween as the gap is spaced apart from the center of the rotary shaft, and
    a gap defined between the upper end of the fluid bearing and the oil thrower ring is tapered in cross-section so as to progressively increase in the distance therebetween as the gap is spaced apart from the center of the rotary shaft.

2. The bearing unit according to claim 1, wherein the oil thrower ring is formed integrally with the rotary shaft.

3. A motor comprising:
    a bearing unit provided with a dynamic pressure fluid bearing having a tapered upper end, the dynamic pressure fluid bearing configured to receive a rotary shaft inserted thereinto;
    a coil disposed on the periphery of the bearing unit;
    a rotor disposed rotatably around the rotary shaft attached to the bearing unit and having a magnet opposed to the coil;
    wherein the bearing unit includes
    a unit main body surrounding the outside of the fluid bearing,
    a lid member covering an upper opening of the unit main body with the rotary shaft inserted into the fluid bearing,
    lubricating oil poured into the unit main body, and
    an oil thrower ring extending perpendicular to the rotary shaft and rotating together with the rotary shaft in a space defined between an upper end of the fluid bearing and the lid member,
    wherein,
    a gap defined between the lid member and the oil thrower ring is tapered in cross-section so as to be progressively reduced in the distance therebetween as the gap is spaced apart from the center of the rotary shaft, and
    a gap defined between the upper end of the fluid bearing and the oil thrower ring is tapered in cross-section so as to be progressively increased in the distance therebetween as the gap is spaced apart from the center of the rotary shaft.

\* \* \* \* \*